Figure 1:
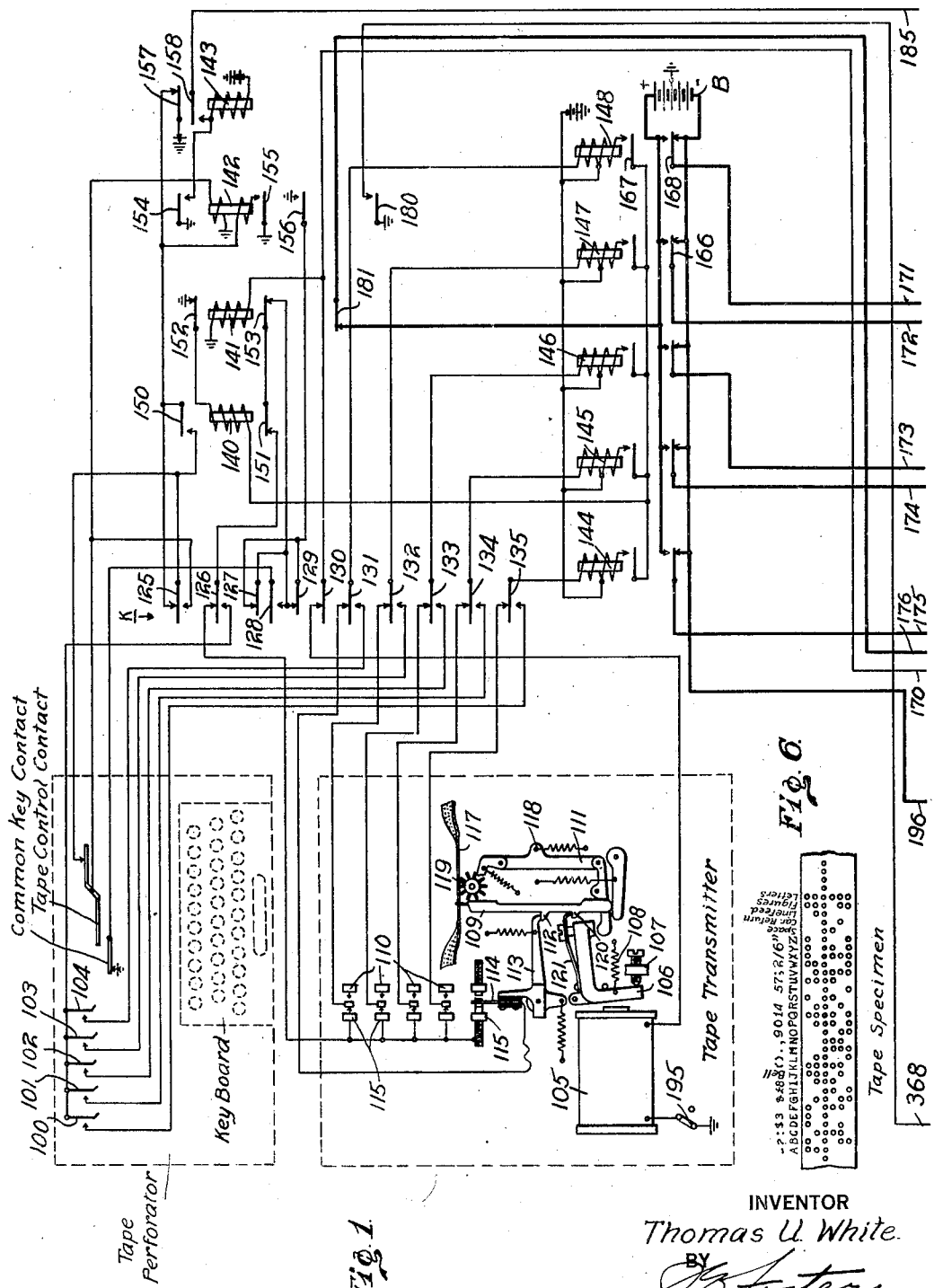

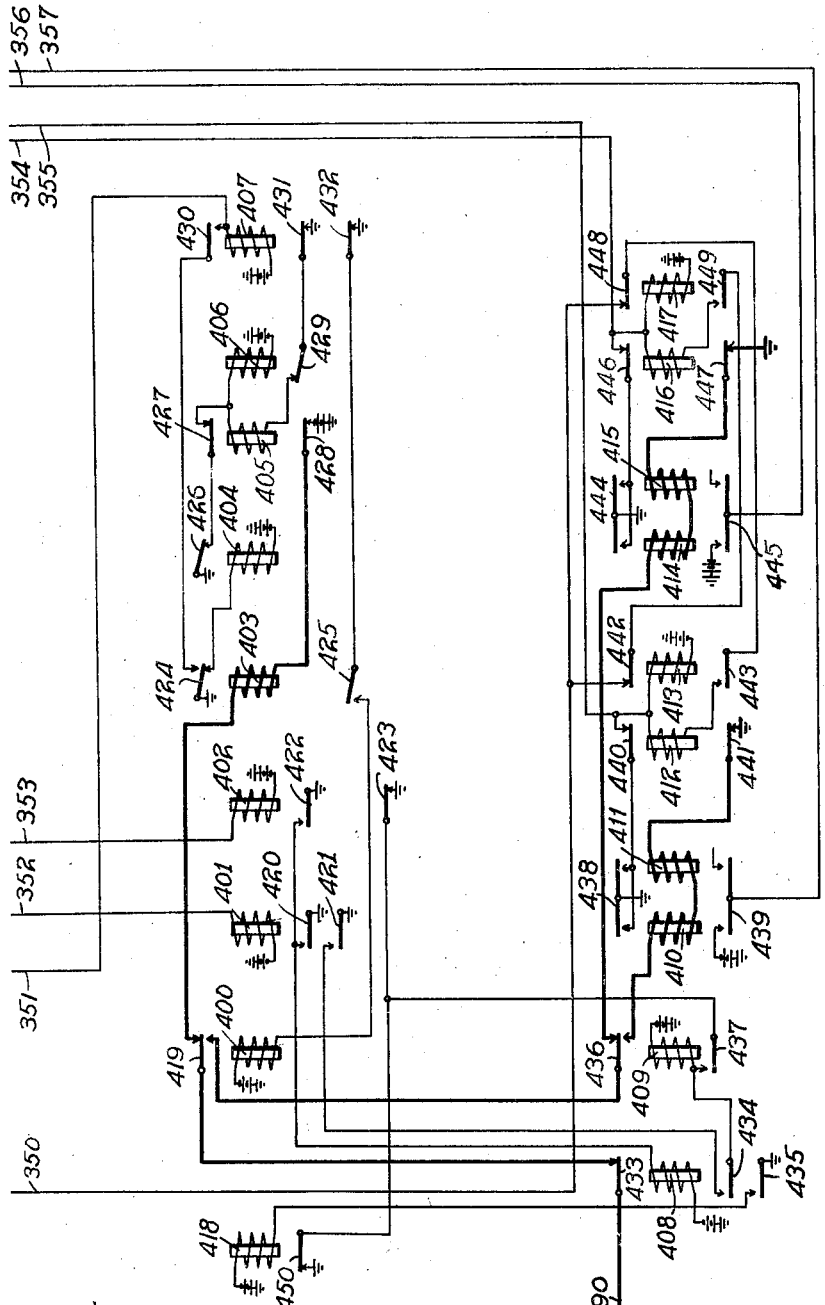

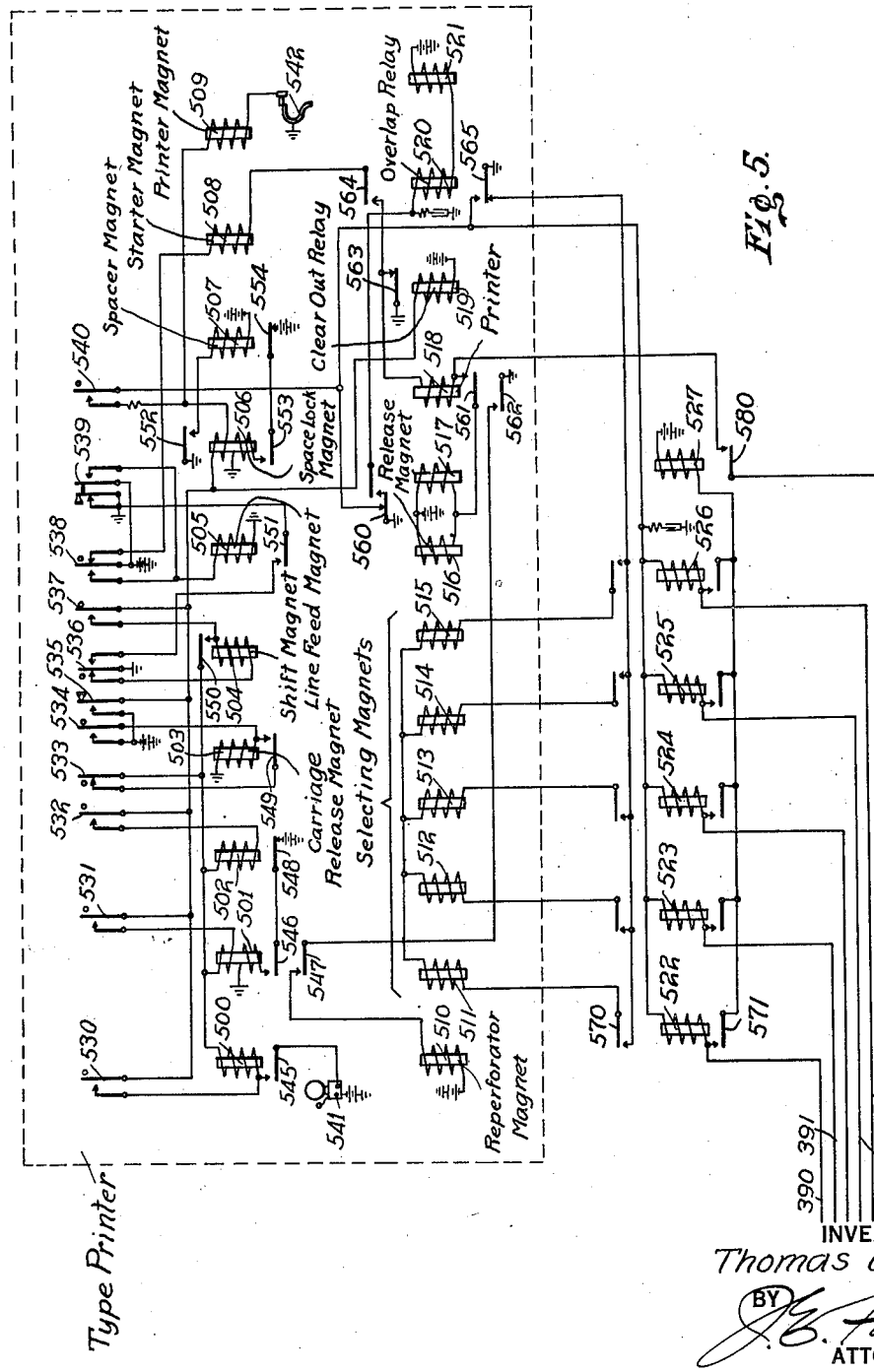

Patented June 24, 1930

1,765,555

UNITED STATES PATENT OFFICE

THOMAS U. WHITE, OF PITTSBURGH, PENNSYLVANIA, ASSIGNOR, BY MESNE ASSIGN-
MENTS, TO WESTINGHOUSE ELECTRIC & MANUFACTURING COMPANY, A CORPORA-
TION OF PENNSYLVANIA

TELEGRAPH SYSTEM

Application filed May 6, 1925. Serial No. 28,281.

My invention relates, in general, to telegraph systems, and more particularly to printing telegraph systems.

One of the objects of my invention is to provide an improved printing telegraph system wherein groups of relays are substituted for the usual synchronous distributers or sunflowers.

Another object of my invention is to provide an improved driving circuit for operating the relays in different groups in synchronism.

Another object of my invention is to provide a driving circuit that may be used to maintain the selecting devices at the transmitting and receiving stations in synchronism and also that may be used to transmit signals between the stations.

Another object of my invention is to provide means for maintaining the selecting devices at each station in synchronism and for signalling between stations over a single circuit.

There are other objects of my invention which, together with the foregoing, will be described in the detailed specification which is to follow.

In practicing my invention, I provide a group of counting relays at the transmitting station and a group of counting relays, corresponding in number, at the receiving station. I also provide a driving circuit at the transmitting station and a driving circuit at the receiving station to control the operation of the counting relays in the counting relay groups in a definite sequence. The driving circuit at the transmitting station is connected with the driving circuit at the receiving station by means of a single circuit. In addition, I provide a tape perforating mechanism at the transmitting station that is adapted to be operated from a keyboard similar to the usual typewriter keyboard. There is also located at the transmitting station a tape transmitter of the usual type employed in the printing telegraph system. At the receiving station, there is provided a type printer of any well known design.

Briefly, the operation of my invention proceeds as follows. When the keyboard perforator at the transmitting station is operated by the operator to record a message that it is desired to transmit, the driving circuit at both the transmitting and receiving stations immediately begins to function to bring about the energization of the relays in the counting relay group in a definite sequence. The tape transmitting device is actuated to bring about the operation of certain of the register relays associated with the tape transmitter. The operation of these register relays predetermines the manner in which the driving circuit will function to control the selection of a desired character in the type printer at the receiving station.

As before explained, the driving circuit functions to bring about the operation of the counting relays in a definite sequence; that is, corresponding counting relays in the counting relay groups at the transmitting and receiving stations, respectively, are operated simultaneously. The operation of the counting relays at the transmitting station serves to select the various register relays of the tape transmitter. The operation of the counting relays in the counting relay group at the receiving station serves to select various selecting magnets of the type printer. As the operation of the driving circuit is controlled by the position of the register relays of the tape transmitter, the selecting relays of the type printer are actuated in accordance with the set-up of the register relays.

After the character has been selected by the action of the driving circuit in controlling the counting relay group at each station, a printing impulse is transmitted over to the driving circuit to actuate the printer magnet of the type printer. The printer magnet operates to cause the typing of the selected character, and this operation is repeated over again for each character that it set up upon the tape transmitter.

Referring now to the drawing, comprising Figures 1 to 5, inclusive, sufficient apparatus and circuits are shown, by means of the usual conventional diagrams, to illustrate my invention.

Figure 2:
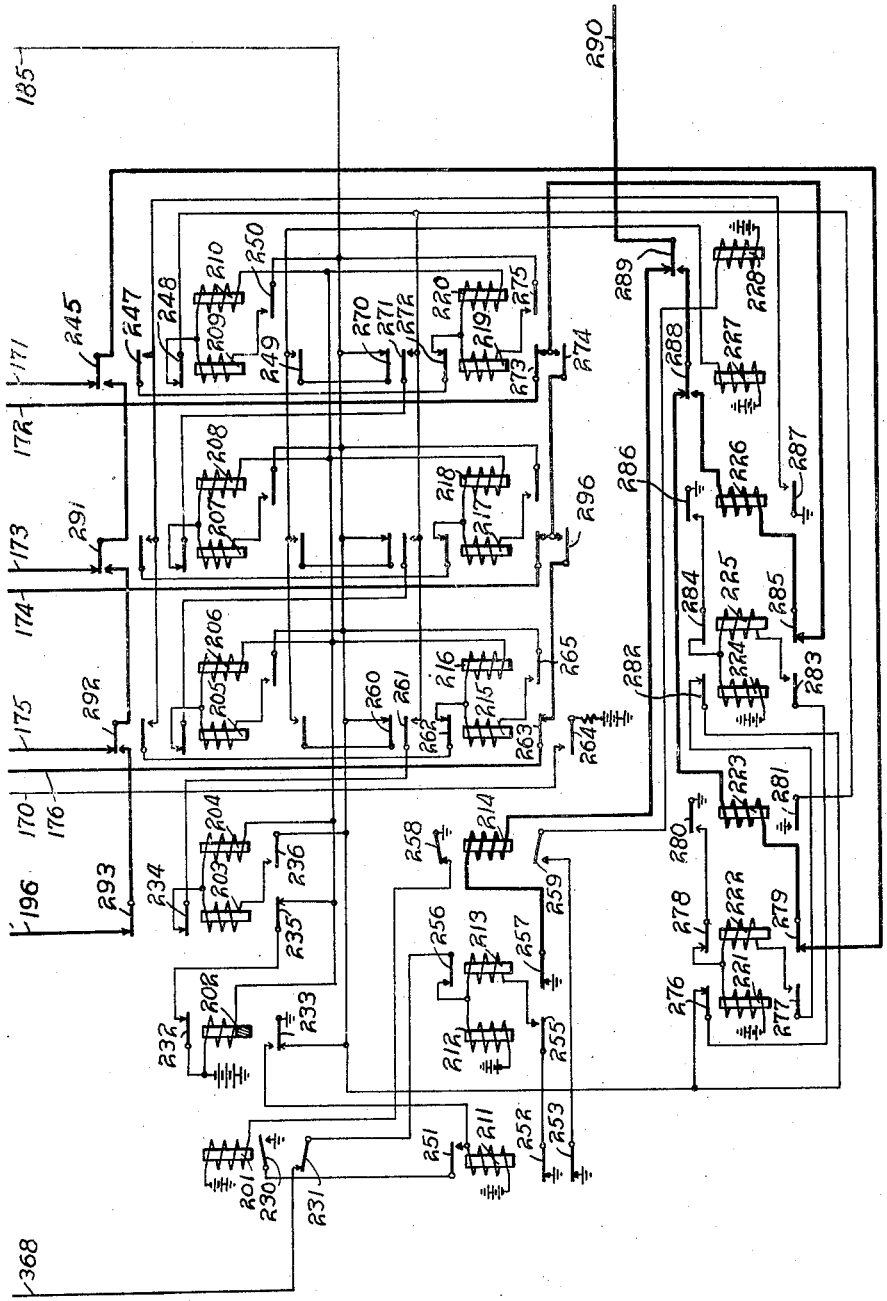

The apparatus and circuits shown in Figs. 1 and 2 are those located at the transmitting station. The apparatus and circuits shown in Figs. 3 to 5, inclusive, are those located at the receiving station.

Referring now to Fig. 1, within the dotted rectangle in the upper left-hand corner of the drawing is indicated a keyboard perforator. This keyboard perforator may be of any well known type,—for example, the type employed by the Western Union Telegraph Company —which has contacts 100 to 104, inclusive, that are adapted to be selected by the operation of the type keys to control the functioning of the transmitting circuits directly without the use of the automatic transmitter. This tape perforator is provided with a common key contact and a tape control contact. The common key contact is operated upon the depression of each key of the keyboard. The tape control contact is operated when the automatic transmitter has caught up, so to speak, with the operation of the perforator, that is, when all the messages have been sent.

The dotted rectangle shown in the lower left-hand corner of Fig. 1 represents the automatic transmitting apparatus. This apparatus may be of any well known type, although, in the present case, the type employed by the Western Union Telegraph Company has been illustrated. The mechanical operation of this type of tape transmitter is thought to be so well known that no description of the mechanical parts will be given at this point, but the operation of this transmitter will be described briefly when the operation of the system is explained.

A cam switch K is provided for changing the circuits of the tape perforator so as to enable it to directly control the transmitting operation without the aid of the tape transmitter.

Relays 140 to 143, inclusive, may be of any well known type, such as those employed in the automatic telephone art. Relays 144 to 148, inclusive, are sending relays and are operated either directly from the tape transmitter or from the tape perforator.

Relays 205 to 210 and relays 215 to 220, inclusive, comprise the relays of the counting relay group at the transmitting station. Relays 200, 201, 202, 211, 212, 213 and 214 and relays 221 to 228, inclusive, of Fig. 2, comprise the driving circuit at the transmitting station. All of these relays are of the usual type well known in the automatic telephone art.

Figure 3:
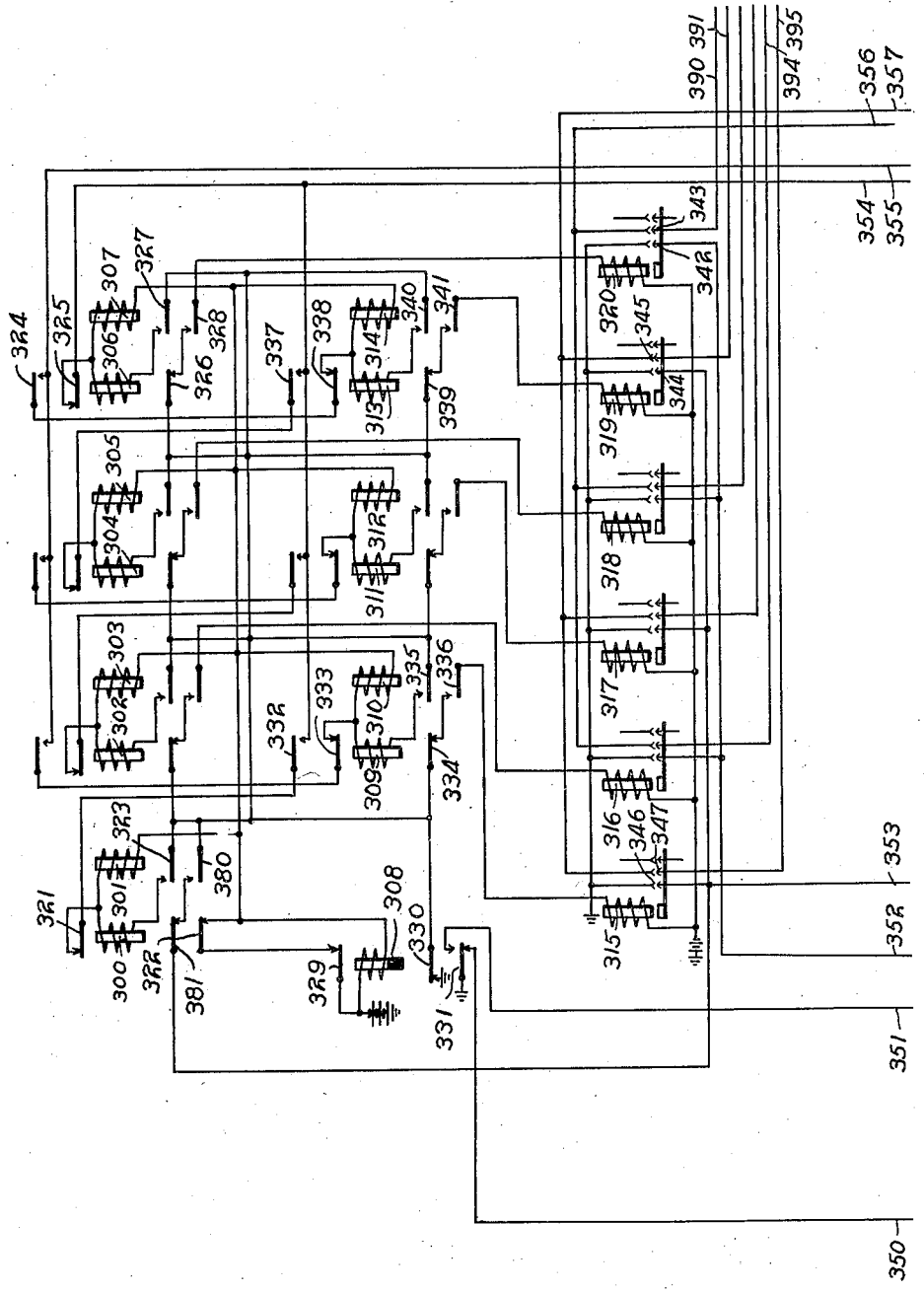

Relays 300 to 314, inclusive, of Fig. 3, comprise the group of counting relays at the receiving station. Relays 315 to 320, inclusive, comprise the group of selecting relays at the receiving station. Relays 315 to 320, inclusive, may be of any well known type.

In Fig. 4, relays 400 to 417, inclusive, comprise the driving circuit at the receiving station.

In Fig. 5, there is indicated, diagrammatically, the circuit diagram of a type printer of a kind that is employed by the Western Union Telegraph Company. Obviously, any other type of printer may be used instead. Relays 522 to 527, inclusive, are the selecting relays and control the functioning of the type printer.

It will be obvious that any usual type of relay may be employed in these circuits. I prefer, however, to employ, in the driving and selecting circuits, the type that is widely used in the automatic telephone art, changing these relays so that they are adapted to respond to 110 volts, instead of the usual 48 volts.

In Fig. 6, there is shown a specimen of the tape employed in this system. This tape is prepared by the tape perforator and is adapted to control the operation of the tape transmitter in a well known manner. All the letters and characters are indicated on the tape.

Having briefly described the apparatus shown in the drawings, I will now explain its detailed operation. For this purpose, it will be assumed that the operator at the transmitting station starts to operate the keyboard of the tape perforator. As a result of this action, the mechanical selecting pins of the perforator are operated to permit certain holes to be punched in the tape in accordance with each character that it is desired to transmit. This tape is then carried through the tape transmitter.

As soon as any operation of the keyboard occurs, the tape between the perforator and the transmitter becomes slack and the tape control contact is permitted to close. As a result of this operation, there is a circuit completed that extends from ground through the upper winding of the starting relay 142, tape control contact, spring 125 of cam switch K and its resting contact, and back contact and armature 157 to battery.

The starting relay 142 is energized to establish a locking circuit for itself at armature 155, to complete a circuit for the relay 143 at armature 154, and to place a ground potential upon the working contacts 115 in the tape transmitter over a circuit that extends from ground by way of front contact and armature 156, spring 129 of cam switch K and its resting contact, back contact and armature 153, armature 151 and its back contact, spring 126 of switch K and its resting contact, to contact members 115 of the tape transmitter.

The transmitting mechanism of the tape transmitter comprises five contact-making members, similar to the contact-making member 114. These contact members are adapted to be controlled by five selecting pins in the same manner that the contact-making member 114 is controlled through the bell crank lever 113 by the selecting pin 109. That is, when the transmitter magnet is deenergized, the ratchet wheel 119 is advanced by the operation of the pawl 111 so that the next series of holes is presented to the ends of the five selecting pins. Whenever holes appear in the tape, certain selecting pins penetrate these perforations, but the remaining selecting pins do not. With the selecting pins in their normal position beneath the tape, all the contact-making members, such as 114, are held in engagement with the so-called spacing contacts 110. When a perforation appears in the tape, the selecting pin corresponding to that perforation moves. Then the bell crank lever 113 is operated to move the contact-making member 114 into engagement with its marking contact member 115. The number of pins that penetrate the perforations determines the number of contact-making members that are brought into contact with their marking contact members. The remaining contact members are maintained in contact with the spacing contacts 110.

When the signals corresponding to the positions of the contact-making members in engagement with their marking contacts have been sent, a circuit is completed for the transmitter magnet 105. The transmitter magnet 105 is energized to attract its armature 106, thereby positioning the wheel 119 and drawing the five selecting pins 109 beneath the tape. When the magnet is deenergized, the wheel 119 is advanced so as to move the tape one space, and the selecting pins are permitted to again contact with the tape so that they may perform their function.

Now, when the relay 142 is energized, as before described, a circuit is completed at armature 156 that connects ground to all the marking contacts, such as 115. Consequently, those pins that have penetrated the perforations will have their associated contact-making members in engagement with the marking contact members 115.

It will be assumed that only the contact-making member 114 is in engagement with its marking contact, as a result of the previous operation of the transmitter magnet following the last operation of the driving circuit. As a result of this operation, a circuit is completed that extends from ground by way of the contact-making member 114, resting contact of spring 131 of switch K and said spring, and upper winding of relay 148 to battery. The relay 148 is energized to establish a locking circuit for itself at armature 167 over a path that extends from ground by way of back contact and armature 152, keyboard relay 140, armature 167 and its front contact, and lower winding of relay 148 to battery. Another result of the operation of the sending relay 148 is that battery is connected to the conductor 171, extending to the armature 245 of the first counting relay 209.

It will be recalled that another result of the operation of the relay 142 is that a circuit is completed for the relay 143. The relay 143 is energized to open the circuit of the relay 142 at armature 157, and to establish a locking circuit for itself at armature 158 over a path that extends from ground by way of back contact and armature 233, conductor 185, armature 158 and its front contact and relay 143 to battery.

When the relay 142 is first energized, a circuit is completed extending from ground by way of armature 180 and its front contact, conductor 368, front contact and armature 231, armature 256 and its back contact, and relay 212 to battery. The relay 212 is energized to complete a circuit that extends from ground by way of back contact and armature 252, armature 255 and its front contact, relay 213 and relay 212 to battery. The relay 213 is not energized so long as the original circuit for the relay 212 is maintained.

When the relay 143 is operated, as before described, the circuit of the relay 142 is opened, and this relay is deenergized to open the original energizing circuit of the relay 143 at armature 154, to remove ground from the marking contacts, such as 115, at armature 156, and to open the original circuit of the relay 212 at armature 180. As a result of the latter operation, the short-circuit is removed from the relay 213 and this relay is permitted to energize.

The selecting apparatus is normally held in an inoperative condition by the holding circuit that may be traced from ground by way of back contact and armature 257, relay 214, back contact and armature 289, trunk conductor 290, armature 433 and its back contact, armature 419 and its back contact, holding relay 403, and armature 428 and its back contact to battery.

The holding relays 214 and 403 are energized over this circuit. The relay 214, upon being energized, completes a circuit for the relay 201 at armature 258, and at armature 259 opens one point in the circuit of the relay 228.

At the receiving station, the relay 403 is energized to open one point in the locking circuit of the relay 407 at armature 424, to complete a circuit for the relay 404 at the front contact of this armature and to open one point in the circuit of the relay 400 at armature 425. The relay 404 is energized to complete a circuit at armature 426 for the relay 406. The relay 406 is energized to complete a circuit that extends from ground by way of back contact and armature 431, armature 429 and its front contact, relay 405 and relay 406 to battery. The relay 405 is not energized until the original energizing circuit of the relay 406 is opened.

When the holding circuit is opened by the operation of the relay 213 in a manner previously described, the holding relays 214 and 403 are deenergized. The relay 214, upon deenergizing, opens the circuit of the relay 201 at armature 258, and at armature 259 completes a circuit that may be traced from ground by way of back contact and armature 253, back contact and armature 259, and relay 228 to battery. The relay 201 is deenergized to prepare one point in the locking circuit of the relay 211 at armature 230, and to open one point in the circuit of the relay 212 at armature 231. The relay 228 is energized to prepare a driving circuit at armature 289 and its front contact.

At the receiving station, the holding relay 403 is deenergized to open the circuit of the relay 404 at armature 424, to prepare a locking circuit for the relay 407 at the back contact of this armature, and to complete a circuit at armature 425 that extends from ground by way of back contact and armature 432, armature 425 and its back contact, and relay 400 to battery. The relay 404 is deenergized to open the original energizing circuit of the relay 406 at armature 426. The relay 405 is energized to open another point in the circuit of the holding relay 403 at armature 428, and to open another point in the circuit of the relay 406 at armature 427. The relay 400 is energized to prepare one point in the driving circuit at armature 419.

At the transmitting station, when the relay 148 was energized, as before described, the positive terminal of the battery B was connected to the conductor 171 at armature 168.

A driving circuit is now completed that extends from the positive terminal of battery B by way of front contact and armature 168, conductor 171, back contact and armature 245, back contact and armature 279, line relay 223, back contact and armature 288, front contact and armature 289, trunk conductor 290, armature 433 and its back contact, armature 419 and its front contact, armature 436 and its back contact, polarized relay 414, and armature 447 and its back contact to ground.

The line relay 223 at the transmitting station and the polarized relay 414 at the receiving station are energized over this circuit.

The direction of current flow over this circuit determines the direction of operation of the armatures 444 and 445 of the polarized relay 414. It will be seen that the direction of current flow over this circuit is controlled by the position of the armature of the relay 148 at the transmitting station. That is, when the relay 148 is not energized, the negative terminal at the battery will be connected to conductor 171, and, consequently, to the driving circuit. In the present case, the relay 148 is energized and the positive terminal of the battery B is connected to the conductor 171 and to the driving circuit. It will be remembered that the operation of the relay 148 is controlled by the operation of the tape transmitter.

This property of the driving circuit by which it is possible to connect either the positive or negative terminal of the battery at the transmitting station to determine the character that is to be transmitted is one of the essential features of my invention, and enables me to secure the control of the driving circuit and the transmission of characters over a single wire.

Continuing with the operation of my invention, it will be remembered that the relay 148 is energized by reason of the operation of the tape transmitter, as previously described. Consequently, the polarized relay 414 will operate the armatures 444 and 445 into engagement with their left-hand front contacts.

At the transmitting station, the line relay 223 is energized to complete a circuit at its armature 280 for the relay 221, and to complete a circuit at armature 281 over a path that extends from ground by way of front contact and armature 281, armature 248 and its back contact, counting relay 210, back contact and armature 235, and back contact and armature 232 to battery.

The relay 221 is energized to open one point in the circuit of the relays 224 and 225 at armature 276, and to complete a circuit at armature 277 over a path that may be traced from ground by way of armature 233 and its back contact, armature 282 and its back contact, armature 277 and its front contact, relay 222 and relay 221 to battery. The relay 222 is not energized over this circuit so long as the original energizing circuit of the relay 221 is maintained.

The relay 210 is energized to complete a circuit that extends from ground by way of back contact and armature 233, armature 250 and its front contact, relay 209, relay 210, back contact and armature 235, and back contact and armature 232 to battery. The relay 209 is not energized over this circuit until the original circuit of the relay 210 is opened.

At the receiving station, the operation of the armature 444 into engagement with its front contact completes a circuit which extends from ground by way of said armature and its front contact, armature 446 and its back contact, and relay 417 to battery.

As a result of the operation of the armature 445 of the relay 414, battery is connected to the conductor 356 that extends to the working contact of springs, such as 343, of the selecting relays 316, 318 and 320.

Another result of the operation of the armature 444 is that a circuit is completed for the counting relay 307 over a path that extends from ground by way of armature 444 and its front contact, armature 446 and its back contact, conductor 354, armature 325 and its back contact, counting relay 307, back contact and armature 322 and back contact and armature 329 to battery.

The relay 307 is energized to complete a circuit at armature 327 over a path that extends from ground by way of back contact and armature 330, armature 327 and its front contact, counting relay 306, counting relay 307, back contact and armature 322, back contact and armature 329 to battery.

The relay 306 is not energized until the original circuit of the relay 307 is opened. Another result of the operation of the relay 307 is that a circuit is completed at armature 328 over a path that extends from ground by way of back contact and armature 330, armature 326 and its back contact, front contact and armature 328, and relay 320 to battery.

The relay 320 is energized to connect ground to conductor 352 at spring 342, and to connect battery to the conductor 310 at spring 343. The circuit over which battery is placed on the conductor 310 may be traced from battery by way of front contact and armature 445 of the line relay 414, conductor 356, working contact and spring 343, conductor 390, selecting relay 522, and normally closed springs controlled by armature 560 to ground.

The selecting relay 522 is energized to establish a locking circuit for itself over a path that extends from battery by way of relay 527, armature 571 and its front contact, relay 522, and normally closed springs controlled by armature 560 to ground.

Another result of the operation of the relay 522 is that a circuit is completed for the selecting relay 511. The selecting relay 511 is energized to operate in the usual manner to permit a disc in the type printer to move into a predetermined position.

By the connection of ground to the conductor 352, a circuit is completed for the relay 401. The relay 401 is energized to complete a circuit for the relay 408 at armature 420 and to prepare a circuit for the relay 409 at armature 421.

The relay 408 is energized to open the driving circuit including the line relays 223 and 414 at armature 433, to complete a circuit for the relay 409 at armature 434, and to complete a circuit for the relay 418 at armature 435. The relay 409 is energized over a circuit that extends from ground by way of armature 421 and its front contact, front contact and armature 434, and relay 409 to battery.

The relay 409 is energized to prepare a point in the driving circuit at armature 436, and to complete a locking circuit for itself at armature 437 to ground by way of back contact and armature 450, and armature 423 and its back contact in multiple.

At the opening of the driving circuit, the line relays 223 and 414 are deenergized.

At the transmitting station, the relay 223 is deenergized to open the original energizing circuit of the relay 221 at armature 280, and to open the original energizing circuit of the relay 210 at armature 281. The relay 222 is energized to open another point in the circuit of the relay 221 at armature 278, and to open another point in the circuit of the line relay 223 at armature 279.

When the original energizing circuit of the relay 210 is opened, the short-circuit is removed from the relay 209 and this relay is energized to open another point in the driving circuit at armature 245, to prepare another point in a new driving circuit at the front contact of this armature, to prepare a circuit for connecting the relay 220 at armature 247, to open another point in the original energizing circuit of the relay 210 at armature 248, and to complete a circuit at armature 249 over a path that extends from ground by way of armature 233 and its back contact, back contact and armature 270, armature 249 and its front contact, and relay 227 to battery.

The relay 227 is energized to disconnect the line relay 223 from the driving circuit and to connect the line relay 226 to the driving circuit at armature 288.

At the receiving station, the relay 418 is operated as a result of the energization of the relay 408. The relay 418 operates its armature 450 to open one point in the locking circuit of the relay 409. It will be recalled that the line relay 410 at the receiving station is now connected to the driving circuit.

When the circuit of the relay 414 is opened, this relay is deenergized and the armatures 444 and 445 assume their normal positions. By the operation of the armature 445, battery is removed from the conductor 356. By the operation of the armature 444, the short-circuit is removed from the relay 416 and ground is removed from the conductor 354. The relay 416 is energized to open another point in the circuit of the relay 417 at armature 446, and to open another point in the circuit of the line relay 414 at armature 447.

The removal of ground from conductor 354 causes the short-circuit to be removed from the counting relay 306. The counting relay 306 is energized to prepare a circuit for the counting relay 313 at armature 324, to open another point in the original energizing circuit of the relay 307 at armature 325, and to open the circuit of the selecting relay 320 at armature 326.

The removal of battery from conductor 356 causes the original energizing circuit of the selecting relay 522 in the type printer to be opened. The relay 522 in the type printer is not deenergized by reason of the fact that its locking circuit is completed. The relay 320 is deenergized to disconnect ground from conductor 352 at spring 342, and to open another point in the circuit of the relay 522 at spring 343. The disconnection of ground from the conductor 352 causes the opening of the circuit of the relay 401.

The relay 401 is deenergized to open the circuit of the relay 408 at armature 420, and to open one point in the original energizing circuit of the relay 409 at armature 421. The relay 408 is deenergized to open another point in the circuit of the relay 409 at armature 434 and to open the circuit of the relay 410 at armature 435. The relay 418 is deenergized to establish another point in the locking circuit of the relay 409. The driving circuit is completed by the deenergization of the relay 408 at armature 433.

The driving circuit is completed that extends from the negative pole of the battery B by way of back contact and armature 166, conductor 172, armature 273 and its back contact, back contact and armature 285, line relay 226, front contact and armature 288, front contact and armature 289, trunk conductor 290, armature 433 and its back contact, armature 419 and its front contact, armature 436 and its front contact, winding of polarized relay 410, and armature 441 and its back contact to ground.

The line relays 226 and 410 are energized over this circuit. As the selecting relay 417 at the transmitting station is not operated by the tape transmitter, the above driving circuit is not effective to transmit any signal to the receiving station. Consequently, the armatures of the relay 410 are operated into engagement with their front right-hand contacts.

At the transmitting station, the relay 226 is energized to complete a circuit for the relay 221 at armature 286, and to complete a circuit at armature 287 over a path that extends from ground by way of said armature and its front contact, front contact and armature 247, armature 272 and its back contact, counting relay 220, back contact and armature 235, and back contact and armature 232 to battery.

The relay 224 is energized to prepare a circuit for the relay 225 at armature 283, and to open a circuit for the relays 221 and 222 at armature 282. The relay 222 is deenergized to prepare a point in the circuit of the relay 221 at armature 278, and to prepare a point in the driving circuit at armature 279. The relay 221 is deenergized to open one point in the circuit of the relay 222 at armature 277, and to complete a circuit at armature 276 over a path that extends from ground by way of armature 233 and its back contact, back contact and armature 276, armature 283 and its front contact, relay 225 and relay 224 to battery. This circuit is not effective to cause the energization of the relay 225 until the original circuit of the relay 224 is opened.

The relay 220 is energized to complete a circuit that extends from ground by way of armature 233 and its back contact, armature 275 and its front contact, relay 219, relay 220, back contact and armature 235, back contact and armature 232 to battery. This circuit is not effective to cause the energization of the relay 219 until the original circuit of the relay 220 is opened.

At the receiving station, it will be recalled, the armatures of the relay 410 are operated into engagement with their right-hand contacts. The operation of the armature 438 serves to complete a circuit for the relay 413 that extends from ground by way of armature 438 and its front contact, armature 440 and its back contact, and relay 413 to battery. The relay 413 is energized to open the circuit for the relays 416 and 417 at armature 442, and to prepare a circuit for the relay 412 at armature 443.

The relay 416 is deenergized to complete one point in the selecting circuit at armature 446 and to prepare a point in the driving circuit at armature 447. The relay 417 is deenergized to open one point in the circuit of the relay 416 at armature 449, and to complete a circuit at armature 448 over a path that may be traced from ground upon grounded conductor 350, back contact and armature 448, armature 443 and its front contact, relay 412 and relay 413 to battery. The relay 412 is not energized over this circuit as long as the original energizing circuit of the relay 413 is maintained.

Another result of the operation of the armature 438 is that a circuit is completed extending from ground by way of said armature and its front contact, armature 440 and its back contact, conductor 355, front contact and armature 324, armature 328 and its back contact, relay 314, back contact and armature 322 and back contact and armature 329 to battery.

The counting relay 314 is energized to complete a circuit at armature 340 over a path that extends from ground by way of back contact and armature 330, armature 340 and its front contact, relay 313, relay 314, back contact and armature 322 and back contact and armature 329 to battery, and to complete a circuit at armature 341 over a path that extends from ground by way of back contact and armature 330, armature 339 and its back contact, front contact and armature 341, and selecting relay 319 to battery. The circuit for the relay 313 is not effective to bring about the operation of this relay until the original circuit of the relay 314 is opened.

The relay 319 is energized to connect ground to conductor 353 at spring 345, and to prepare a circuit for the selecting relay 523 of the type printer at spring 344. By reason of the fact that the armature 439 of the line relay 410 has been operated into engagement with its front right-hand contact, the operation of the spring 344 of the relay 319 is without function at the present time.

The connection of ground to conductor 353 brings about the energization of the relay 402. The relay 402 is energized to complete a circuit for the relay 408 at armature 422 and to open one point in the locking circuit of the relay 409 at armature 423.

The relay 408 is energized to open the circuit of the line relays 226 and 410 at armature 433, to prepare a point in the circuit of the relay 409 at armature 434, and to complete a circuit for the relay 418 at armature 435.

By the opening of the driving circuit, the line relays 226 and 410 are deenergized. By the operation of the relay 418, the locking circuit of the relay 409 is opened, and this relay is deenergized to connect the line relay 414 to the driving circuit at the receiving station.

It should be noted that the relay 418 is placed in the circuit to prevent the operation of the relay 409 until the driving circuit has been opened for a short interval of time. This is to permit the operation of the line relays 226 and 410 and their associated circuits. This insures that the driving circuit at the dispatcher's office will be opened so that there will be no operation of the relay 414 when it is connected to the circuit by the deenergization of the relay 409. The manner in which this circuit functions at the transmitting station will be explained hereinafter.

At the transmitting station, the line relay 226 is deenergized to open the original energizing circuit of the relay 224, thereby removing the shunt from the relay 225, and to open the original energizing circuit of the relay 220 at armature 287. The relay 225 is energized to open another point in the circuit of the relay 224 at armature 284, and to open another point in the circuit of the relay 226 at armature 285.

By the opening of the original energizing circuit of the relay 220, the short-circuit is removed from the relay 219, permitting this relay to operate. Upon operating, the relay 219 opens the circuit of the relay 227 at armature 270, prepares a circuit for the counting relay 208 at armature 271, opens another point in the original energizing circuit of the relay 220 at armature 272, at armature 273 opens another point in the driving circuit, and at armature 274 prepares another point in the driving circuit.

The relay 227 is deenergized to disconnect the line relay 226 from the driving circuit and to connect the line relay 223 thereto at armature 288.

At the receiving station, the line relay 410 is deenergized to remove the short-circuit from the relay 412 at armature 438, and to remove ground from conductor 355 at the same armature. The relay 412 is energized to open another point in the circuit of the relay 410 at armature 441, and to open another point in the original energizing circuit of the relay 413 at armature 440.

The removal of ground from the conductor 355 causes the short-circuit to be removed from the counting relay 313. The counting relay 313, upon operating, prepares a circuit for the counting relay 305 at armature 337, opens another point in the original energizing circuit of the relay 314 at armature 338, and opens the circuit of the selecting relay 319 at armature 339. The selecting relay 319 is deenergized to open another point in the circuit of the selecting relay 523 at spring 344, and to remove ground from conductor 353 at spring 345.

The removal of ground from conductor 353 brings about the deenergization of the relay 402. The relay 402 is deenergized to open the circuit of the relay 408 at armature 422, and to prepare a locking circuit for the relay 409 at armature 423.

The relay 408 is deenergized to complete the driving circuit at armature 433, to open another point in the circuit of the relay 409 at armature 434, and to open the circuit of the relay 418 at armature 435. The relay 418 is deenergized to prepare another point in the locking circuit of the relay 409.

The driving circuit is now completed over a path that extends from the negative terminal of the battery B by way of back contact and armature 164, conductor 173, back contact and armature 291, front contact and armature 245, back contact and armature 279, line relay 223, back contact and armature 288, front contact and armature 289, trunk conductor 290, armature 433 and its back contact, armature 419 and its front contact, armature 436 and its back contact, polarized relay 414, and back contact and armature 447 to ground.

The relays 223 and 414 are operated over this circuit. The armatures 444 and 445 of the line relay 414 at the receiving station are, however, operated into engagement with their front right-hand contacts, due to the fact that the selecting relay 146 at the transmitting station is deenergized. Consequently, the operation of the armature 445 at the receiving station is without particular function at the present time.

The operation of the line relays 223 and 414 produce the same result as before, so far as the operation of the counting relays are concerned. This action is continued until a complete cycle of selections for one letter has been made. This will be briefly explained.

At the transmitting station, the line relays 223 and 226 are alternately connected to the driving circuit and control the operation of certain other relays 221, 222, 224 and 225, respectively, causing the energization of the counting relays 208, 207, 218, 217, 206, 205, 216, 215, 204 and 203 in the sequence mentioned.

At the receiving station, the line relays 414 and 410 are alternately connected to the driving circuit to cause the operation of the counting relays 305, 304, 312, 311, 303, 302, 310, 309, 301 and 300 in the sequence mentioned. The operation of these counting relays controls the operation of the selecting relays 318, 317, 316, and 315 in the sequence mentioned.

The functioning of the driving circuit at both the transmitting and the receiving stations to produce the operation of these relays is thought to be obvious from the preceding description. The corresponding counting relays at each station, are, of course, energized simultaneously.

As no other sending relay or register relay, such as 148, has been energized at the transmitting station, no other signalling circuit is closed. By this, it is meant that the driving circuit is always closed from the negative terminal of the battery B. Of course, this only occurs for a certain definite character. Other characters may cause the driving circuit to be completed two, three, four or five times from the positive terminal of the battery B.

In this case, corresponding operations will occur in the type printer. That is, if the driving circuit is completed one, two, three, four or five times from the positive terminal of the battery, or, in certain combinations, one, two, three, four or five of the selecting relays, such as 522, of the printer will be operated together, or in varying combinations, depending upon the operation of the set-up relays to produce operation of the so-called interference plates or discs in the printer.

The operation of the selecting magnets in the printer causes the movement of the interference plates to place a stop in a certain definite position in the path of the type wheel. This is so that, when the printing impulse is received, as will be described, the proper character will be typed by the operation of the plunger, pushing the paper into engagement with the type wheel. The operation of the printer is thought to be well known and, consequently, has only been briefly described.

When the counting relay 216 at the transmitting station is operated, as a result of the energization of the line relay 223, the counting relay 310 at the receiving station is energized by the operation of the line relay 410. The energization of these counting relays occurs simultaneously by the operation of the driving circuit, in a manner similar to that previously described.

At the transmitting station, the relay 216, upon operating, completes a circuit for the counting relay 215 at armature 265. The counting relay 215 is not energized until the line relay 226 is deenergized.

At the receiving station, the counting relay 310, upon operating, completes the circuit for the relay 309 at armature 335, and at armature 336 completes a circuit that extends from ground by way of back contact and armature 330, armature 334 and its back contact, front contact and armature 336, and relay 315 to battery.

The relay 309 is not energized so long as the line relay 410 is maintained operated, due to the fact that it is short-circuited by the original circuit for the relay 310.

The selecting relay 315 is energized to connect ground to conductor 353 at spring 346, and to complete a circuit at spring 347 over a path that extends from battery by way of front contact and armature 439, conductor 357, working contact and spring 347, conductor 395, armature 580 and its front contact, printer relay 518, and back contact and armature 563 to ground.

The printer relay 518 is energized to complete a circuit for the release magnets 516 and 517, and to prepare a circuit at armature 562 that may be used for operating a relay 510 at a reperforator in the event that it is desired to relay the message.

It will be seen that the circuit for the printer relay 518 just traced extends from the front contact of the armature 439 of the line relay 410. It therefore follows that the polarized line relay 410 must be operated in such direction as to bring about the engagement of the armature 439 with its front left-hand contact. This is accomplished by so connecting the driving circuit that, upon its closure it is connected to the positive terminal of the battery B at the transmitting station. The driving circuit that operates the line relays 226 and 410 to cause the operation of the counting relays 216 and 310, respectively, extends from the positive terminal of the battery B by way of back contact and armature 181, conductor 176, armature 263 and its back contact, armature 296 and its front contact, armature 274 and its front contact, back contact and armature 285, front contact and armature 288, front contact and armature 289, trunk conductor 290, armature 433 and its back contact, armature 419 and its front contact, armature 436 and its front contact, polarized line relay 410, and back contact and armature 441 to ground.

The current flow over this circuit brings about the operation of armatures 438 and 439 of the polarized relay 410 to engagement with their front left-hand contacts. This causes the completion of the circuit for the printer magnet 518 previously described.

Referring now to the operation of the printer, certain combinations of characters operate what are termed "stunt" relays to control the various functioning of the printing apparatus. The interference plates, in operating, cause stops to be prepared for operating the springs 530 to 540, inclusive, in order to control the various functions of the printer. That is, the spring 530 controls the operation of a bell in accordance with a certain signal combination to call the attention of the receiving operator.

The relay 501 is operated to cause the relaying of the message to another station. The relay 502 is employed to unlock the relay 501. The magnet 503 is a carriage-release magnet; the magnet 504 is a shift magnet; the magnet 505 is a line feed magnet; the relay 506 is a space lock relay; the magnet 507 is a spacer magnet; the magnet 508 is a starter magnet; and the magnet 509 is a printer magnet.

Upon the operation of the release magnet 517, the locking circuit of the relay 522, and also the circuit of the relay 527, is opened. These relays are, consequently, deenergized. Another result of the operation of the armature 560 of the release magnet 517 is that a circuit is completed for the overlap relay 520. The overlap relay 520 is energized to complete a circuit for the starter magnet, which operates to release the type shaft. Upon making contact between the striking arm of the type shaft and the stop bar 542, a circuit is completed for the printer magnet 509 through the space lock relay and the clear-out relay to battery. The relays 509, 506 and 518 are energized. The printer magnet 509 causes the printing of the letter.

The space lock relay 506, upon energizing completes a locking circuit for itself at armature 553, and at armature 552 completes a circuit for the spacer magnet 507. The spacer magnet 507 is operated to open the locking circuit of the relay 506. The operation of the overlap relay 520 also opens the circuit of the selecting magnet 511 before the relay 522 is deenergized.

It will be seen that the overlap relay 520 functions to permit increased speed by bringing about the release of the selecting relays after they have functioned and before a character is printed. The selecting relays are thus free to receive a new set of impulses while the printer is operating. The deenergization of the selecting magnets that may be energized does not release the selected letter by reason of the fact that the stop bar remains in the slots of the interference plates or selecting discs.

As the selecting relays 522 to 527, inclusive, are operated by succeeding impulses for a new character, their operation does not cause the functioning of the selecting magnets until the overlap relay 520 is deenergized. When the printing cycle of the first character is completed, the overlap relay is deenergized and the selecting magnets are permitted to operate. The reception of a printing impulse will cause the energization of the relay 518 and the functioning of the type printer, as before.

Returning now to the operation of the selecting apparatus, it will be remembered that the operation of the relay 315, following the completion of the driving circuit that initiated the printing operation, brings about the energizaton of the relay 402. The relay 402 is operated to cause the operation of the relays 408 and 418. As a result of the operation of the relay 408, the driving circuit, including the relays 226 and 410, is opened.

The deenergization of the relay 226 at the transmitting station brings about the operation of the counting relay 215. The deenergization of the line relay 410 at the receiving station brings about the operation of the counting relay 309 and the opening of the circuit of the printer magnet 518.

The counting relay 215 at the transmitting station is operated to open the circuit of the relay 227 at armature 260, to prepare a circuit for the counting relay 204 at armature 261, to open another point in the driving circuit at armature 263, and to complete a circuit at armature 264 over a path that extends from battery by way of front contact and armature 264, conductor 170, and relay 141 to ground. A circuit in multiple with that above traced extends by way of the springs 130 of the cam switch K through the transmitter magnet 105 of the tape transmitter and thence to ground by way of the switch 195.

The relay 141 is energized to open the circuit of the keyboard relay 140 and the circuit of the selecting relay 148 at armature 152. The selecting relay 148 is deenergized to remove battery from the conductor 171 that extends through the back contact of the armature 245 of the counting relay 209. Of course, if other selecting relays were operated, as in the case of the different characters, these relays would be deenergized with the consequent disconnection of battery from the contacts of the various selecting relays. By battery, in this case, is meant positive battery. The relay 227 is deenergized to prepare a point in the driving circuit at armature 288.

At the receiving station, the counting relay 309 is energized to prepare a point in the impulsing circuit that extends to the counting relay 301 at armature 332, and to open the circuit of the selecting relay 315 at armature 334.

The selecting relay 315 is deenergized to open the circuit of the relay 402. The relay 402 is deenergized to open the circuit of the relay 408. The relay 408 is deenergized to complete the driving circuit, and to open the circuit of the relay 418. The relay 418 is deenergized to prepare a point in the locking circuit of the relay 409.

When the relay 418 is operated, upon the energization of the relay 408, following the operation of the relay 402, the locking circuit of the relay 409 was opened and this relay was deenergized. The relay 409 operates to prepare a point in the driving circuit at armature 436.

Now, when the relay 408 is deenergized, as before described, there is a circuit completed that extends from the negative pole of the battery B by way of conductor 196, back contact and armature 293, front contact and armature 292, front contact and armature 291, front contact and armature 245, back contact and armature 279, line relay 223, back contact and armature 288, front contact and armature 289, trunk conductor 290, armature 433 and its back contact, armature 419 and its front contact, armature 436 and its back contact, polarized line relay 414 and armature 447 and its back contact to ground. The line relays 223 and 414 are operated over this circuit.

The line relay 414 operates its armatures into engagement with their front right-hand contacts by reason of the fact that the driving circuit is completed from the negative terminal of the battery B.

As a result of the operation of the line relay 223 at the transmitting station, the relay 221 is energized. A circuit is completed for the counting relay 204, as well as for the relay 222. The relay 204 is operated to complete a circuit for the relay 203 at armature 236. The circuit for the relay 203 is not effective until the line relay 223 is deenergized.

At the receiving station, the operation of the line relay 414 brings about the energization of the relay 417 and the operation of the counting relay 301. The counting relay 301 is energized to complete a circuit for the relay 300. Another result of the operation of the relay 301 is that a circuit is completed at armature 380 that extends from ground by way of back contact and armature 330, armature 380 and its front contact, armature 381 and its back contact, conductor 353, and relay 402 to battery.

The relay 402 is energized to cause the operation of the relay 408. The relay 408 is operated to open a point in the driving circuit, and to complete a circuit for the relay 418. The relay 418 is operated to open one point in the locking circuit of the relay 409. Upon the opening of the driving circuit, the line relays 223 and 414 are deenergized.

At the transmitting station, the line relay 223 is deenergized to remove the short-circuit from the counting relay 203, and to permit the energization of the relay 222. The relay 222 is operated to open another point in the driving circuit. The counting relay 203 is operated to open another point in the driving circuit at armature 293, and to remove the short-circuit from the slow-acting relay 202 at armature 235.

The slow-acting relay 202 is thereby energized in series with all the counting relays 203 to 210, inclusive, and 215 to 220, inclusive. The relay 202, upon operating, opens the circuit of all the counting relays 203 to 210, inclusive, and 215 to 220, inclusive, as well as its own circuit at armature 233, and to complete a circuit at the front contact of this armature for the relay 211. Another result of the operation of the relay 202 is that the circuit of the relays 221, 222 and 143 is opened.

The relays 203 and 210, inclusive, and 215 to 220, inclusive, retract their armatures and restore their respective circuits to normal. The relays 221 and 222 are also deenergized to restore the circuits that they control to normal. As a result of the operation of the counting relay 215 retracting its armature 264, the circuit of the relay 141 is opened, as well as the circuit of the magnet 105.

When battery is first placed upon the conductor 170 by the operation of the selecting relay 223, a circuit is completed for the transmitter magnet 105 of the tape transmitter in multiple with the circuit for the lockout relay 141. When the selecting relay 223 is deenergized, the circuit of the magnet 105 is opened. The magnet 105 is energized to withdraw the selecting pins, such as 109, from contact with the tape and to advance the feed wheel 119 one step. By the deenergization of the magnet 105, the five selecting pins are permitted to contact with the tape and the pawl 111' is operated to position itself, by the action of spring 118, so as to be in a position to advance the feed wheel upon the next operation of the magnet. The selecting pins that penetrate the holes in the tape determine the contact-making members 114 that are brought into engagement with their respective marking contact members 115. This, in turn, determines what selecting relays will be operated upon the next energization of the starting relay 142.

The relay 141 is deenergized to prepare a circuit for the relay 142 at armature 153, and to prepare a locking circuit at armature 152 for the selecting relays 144 to 148, inclusive.

The relay 211 is energized to establish a locking circuit for itself at armature 251, to open the circuit of the relays 212 and 213 at armature 252, and to open the circuit of the relay 228 at armature 253. The relay 212 is deenergized to open one point in the circuit of the relay 213. The relay 213 is deenergized to prepare a starting circuit at armature 256, and to prepare a point in the holding circuit at armature 257.

The relay 228 is deenergized to open one point in the driving circuit at armature 289, and to prepare a holding circuit at the back contact of this armature. The slow-acting relay 202 is deenergized after a short interval of time, its circuit being opened by the operation of armature 233.

At the receiving station, the deenergization of the relay 414 brings about the operation of the relay 300 and also the operation of the relay 416. The relay 416 is operated to cause the deenergization of the relays 412 and 413 with the same result as before described.

The relay 300 is energized to open another point in the original energizing circuit of the relay 301 at armature 321, to remove the short-circuit from the relay 308 at armature 322, and to open the circuit of the relay 402 at armature 381. The relay 402 is deenergized to open the circuit of the relay 408. The relay 408 is deenergized to prepare a point in the holding circuit at armature 433, and to open the circuit of the relay 418 at armature 435. The relay 418 is deenergized to prepare a point in the locking circuit of the relay 409.

The slow-acting relay 308 is energized to remove ground from conductor 350 at spring 331, to place ground upon conductor 351 at the front contact of this armature, and to open the circuit of the relays 300 to 307, inclusive, and 309 to 314, inclusive, as well as its own circuit at armature 330. The relays 300 to 307, inclusive, and 309 to 314, inclusive, are deenergized to restore the circuits that they control to normal.

The application of ground to conductor 351 brings about the operation of the relay 407. The removal of ground from conductor 350 opens the circuit of the relays 416 and 417. These relays are deenergized with the same results as before described.

The relay 407 is energized to establish a locking circuit for itself at armature 430, to open the circuit of the relays 405 and 406 at armature 431, and to open the circuit of the relay 400 at armature 432. The relay 406 is deenergized to open one point in the circuit of the relay 405. The relay 405 is deenergized to prepare a point in the circuit of the relay 406 at armature 427, and to prepare a point in the holding circuit at armature 428. The relay 400 is deenergized to open one point in the driving circuit at armature 419, and to complete the holding circuit at the back contact of this armature.

The holding circuit is now established that extends from ground by way of back contact and armature 257, holding relay 214, back contact and armature 289, trunk conductor 290, armature 433 and its back contact, armature 419 and its back contact, holding relay 403, and armature 428 and its back contact to battery. The holding relays 214 and 403 are energized over this circuit.

The holding relay 214, upon operating, completes a circuit for the relay 201 at armature 258, and at armature 259 opens another point in the circuit of the relay 228. The relay 201 is energized to open the locking circuit of the relay 211 at armature 230, and to prepare a point in the starting circuit at armature 231.

The relay 211 is deenergized to prepare a point in the circuit of the relay 213 at armature 252, and to prepare a point in the circuit of the relay 228 at armature 253. In this manner, after one character has been sent, the selecting apparatus at the transmitting station is restored to normal and circuits are prepared for the next character.

At the receiving station, the holding relay 403 operates to complete a circuit for the relay 404 at armature 424, to open the locking circuit of the relay 407 at the back contact of this armature, and to open another point in the circuit of the relay 400 at armature 425.

The relay 407 is deenergized to prepare a point in the circuit of the relay 400 at armature 432, and to prepare a point in the circuit of relay 405 at armature 431. The relay 404 is operated to complete a circuit for the relay 406. The relay 406 is energized to prepare a circuit for the relay 405. In this manner, after the signals constituting one character have been sent, the selecting apparatus at the receiving station is restored to normal and circuits are prepared for the reception of a new character.

When the relay 143 at the transmitting station is deenergized, following the operation of the slow-acting relay 202, a circuit is completed at armature 157 for the starting relay 142, if the tape control contact is closed. The relay 142 completes a circuit for the relay 143 at armature 154, places ground upon the marking contact 115 at armature 156, and completes a starting circuit at armature 180. To complete this circuit, it will be seen that the relay 201 must be energized. As this does not occur until a holding circuit has been established, it is insured that all the selecting apparatus will be restored to normal at both the transmitting and receiving stations before the selecting apparatus is again operated to send the signals constituting the next character.

Ordinarily, the operation of the relay 142 and the relay 143 brings about the functioning of the driving circuit in the same manner as previously described, to complete the cycle of operations on the relay selecting apparatus at the transmitting and receiving stations. The functions occur in substantially the same manner as before, and the type printer at the receiving station is operated in accordance with the next character.

The speed of the selecting relays under the control of the driving circuit is very high, it being possible to operate the counting relays constituting the selecting apparatus in a fraction of a second. Thus, it will be clear that the driving circuit and the selecting or counting relays will function at a higher speed and more advantageously than the synchronously-operating distributers formerly used. It will be obvious, also, that the control of the selecting apparatus is carried on over a single circuit and that this same circuit is utilized to transmit the signals constituting the set-up characters.

It will also be obvious that all the functions that are incorporated in the ordinary tape transmitter may be employed in the present system without any deviation from standard practice. To illustrate, if it is desired to repeat any definite character, switch 195 will be operated. As a result of this operation, and battery being placed upon conductor 170, no operation of the transmitter magnet 105 occurs and the same character will be repeated by the functioning of the selecting apparatus in the manner described. Other features are just as readily taken care of.

Attention is directed to the fact that the line relays 223 and 227 at the transmitting station and the line relays 410 and 414 at the receiving station must be connected to the driving circuit alternately in order to cause the proper operation of the counting relays.

The counting relays at the transmitting station must be energized in the proper sequence in order to control the operation of the relay 327 and the proper operation of the driving circuit in each case. That is, unless the counting relays are operated in the proper sequence, the relay 227 will not be operated at the proper time to connect the proper line relay to the driving circuit. At the same time, if the correct polarity is placed on the conductor leading to the driving circuit, this interconnection insures that the driving circuit and selecting apparatus at the transmitting station must function properly or not at all.

At the receiving station, the line relays 414 and 410 must be alternately connected to the driving circuit in order to cause proper sequential operation of the counting relays 300 to 314, inclusive. The operation of the counting relays controls the energization of the selecting relays 315 to 320, inclusive, in the proper sequence. These relays must be operated properly in order that the relays 401 and 402 will properly control the operation of the relays 408 and 409 to determine what relay is connected to the driving circuit of the relays 410 and 414. This interconnection of circuits insures the proper operation of the selecting equipment.

It will be recalled that it was stated, in the preliminary part of the specification, that the selecting apparatus may be controlled directly from the keyboard of the type printer perforator. To bring this about, switch K will be operated to cause springs 130 to 135, inclusive, to assume the position opposite to that shown in the drawing. The operation of these circuits associates the selecting relays with the springs 100 to 104, inclusive, of the keyboard perforator. The springs 100 to 104, inclusive, are controlled directly by the keys of the keyboard perforator. That is, one or more of these springs, depending upon the letter that it is desired to print, is caused to engage their working contacts. The operation of these devices, when the signals are sent directly from the keyboard perforator, will be obvious without further description.

My invention is not limited to the particular arrangement of the apparatus described, but may be variously modified without departing from the spirit and scope thereof, as set forth in the appended claims.

I claim as my invention:

1. In a telegraph system, a transmitting station, a receiving station having a receiver, a distributor at each of said stations comprising a chain of relays, each of said chains of relays being arranged in groups, means including said distributors for transmitting code combinations of impulse conditions from said transmitting station to said receiving station, means including said distributor at said receiving station for distributing said impulses to said receiver at said receiving station, means whereby the succeeding relays energized are in different groups and means whereby said code combinations of impulse conditions maintain said distributors in synchronism.

2. In a telegraph system, a transmitting station, a receiving station, transmitting mechanism at said transmitting station, receiving mechanism at said receiving station, a distributor at each of said stations comprising chains of relays arranged in groups, means whereby the succeeding relays are in different groups, means including said distributor at said transmitting station for transmitting code combinations of impulses to said receiving station, means responsive to said impulses at said transmitting station for energizing said relays in sequence, means including said distributor at said receiving station for operating said receiving mechanism thereat in accordance with said received code combinations of impulses and means responsive to said same received impulses and operating said receiving distributor in synchronism with said transmitting distributor.

3. In a telegraph transmitting system, a transmitting station having transmitting mechanism, a remote receiving station having receiving apparatus, a distributor comprising a chain of relays, each of said chains of relays being arranged in groups, a line relay individual to each group at each of said stations, a signalling line connecting said stations, means for associating said signalling line with one of said line relays at each of said stations, means including said distributor at said transmitting station for transmitting a code impulse over said signalling line through one of said line relays at each station, means responsive to energization of said line relays for operating a relay in its associated group and for simultaneously associating said signalling line with others of said line relays, means including said other line relays for transmitting a second code impulse and means including said distributor at said second station for operating said receiver in accordance with said received code combinations of impulses.

4. In a telegraph system, a transmitting station, a receiving station, a distributor comprising a chain of relays at said transmitting station, a distributor comprising a chain of relays at said receiving station, means including said distributor at said transmitting station for transmitting code combinations of impulses to said receiving station, means including said distributor at said receiving station for operating said receiver thereat in accordance with the received code combinations of impulses, means responsive to said impulses for operating said distributors in synchronism and means whereby said transmitted impulses are originated at said transmitting station and terminated at said receiving station.

5. In a telegraph system, a transmitting station, a receiving station, a distributor at said transmitting station, a distributor at said receiving station, means including said distributor at said transmitting station for transmitting code combinations of impulses to said receiving station, means including said distributor at said receiving station for operating said receiver thereat in accordance with the received code combinations of impulses, means responsive to said impulses for operating said distributors in synchronism and means whereby said transmitted impulses are originated at the transmitting station and terminated at said receiving station.

6. In a telegraph system, a transmitting station, a remote receiving station, a signalling line connecting said stations, a distributor comprising a chain of relays at each of said stations, a transmitter at said transmitting station, a receiver at said receiving station, means including said transmitting distributor and controlled by said transmitter for transmitting code combinations of impulse conditions from said transmitting station to said receiving station over said signalling line, means including said distributor at said receiving station for distributing said received impulses to said receiver whereby said receiver is operated in accordance with said received code combinations of impulses, means responsive to said impulses for operating said transmitting and receiving distributor step by step and means whereby said impulses are originated at said transmitting station and terminated at said receiving station whereby said distributors are maintained in synchronism.

7. In a telegraph system, a transmitting station, a remote receiving station, a signalling line connecting said stations, a distributor at each of said stations, a transmitter at said transmitting station, a receiver at said receiving station, means including said transmitting station distributor and controlled by said transmitter for transmitting code combinations of impulses from said transmitting station to said receiving station over said signalling line, means including said distributor at said receiving station for distributing said received impulses to said receiver whereby said receiver is operated in accordance with said received code combinations of impulses, means responsive to said impulses for operating said transmitting and receiving distributor step by step and means whereby said impulses are originated at said transmitting station and terminated at said receiving station whereby said distributors are maintained in synchronism.

8. In a telegraph system, a transmitting station, a receiving station, a distributor comprising a chain of relays at said transmitting station, a distributor comprising a chain of relays at said receiving station, a signalling line connecting said stations, means including said distributors for transmitting code combinations of impulse conditions over said signalling line, means responsive to said impulses for operating said distributors step by step and means whereby each of said impulses are originated in one of said stations and terminated at the other of said stations.

9. In a telegraph transmitting station system, a receiving station, a chain of counting relays at said transmitting station, a chain of relays at said receiving station, a chain of selecting relays at each of said stations, means including said counting relays for controlling said selecting relay chain, means including said selecting relays at each of said stations for transmitting code combinations of impulse conditions from said transmitting station to said receiving station and means responsive to said impulses for operating said chains of relays in synchronism.

10. In a telegraph system, a transmitting station, a receiving station, a chain of relays at each of said stations each arranged in groups, a line relay for each group, a signalling line connecting said stations, means for associating said signalling line with one of said line relays at each station, means including one of said relays of said chain for transmitting an impulse from said transmitting station to said receiving station through said line relays, means responsive to said received impulse at said receiving station for terminating said impulse, means responsive to the termination of said impulse for switching said signalling line to another of said line relays and means whereby the succeeding impulse is transmitted through a relay of the group associated with said other line relay.

11. In a telegraph system, a transmitting station, a receiving station, a distributor at each of said stations each having a plurality of operating positions, means including said transmitter for transmitting code combinations of impulses from said transmitting station to said receiving station, means controlled by said impulses for operating said distributors in synchronism and means whereby said distributor at said transmitting station is held in each of its operated positions until the receiving distributor has reached the equivalent position.

12. In a telegraph system, a transmitting station, a receiving station, a distributor comprising a relay chain at each of said stations each having a plurality of positions, means including said transmitter and distributor thereat for transmitting code combinations of impulses from said transmitting station to said receiving station through said receiving station distributor, means controlled by said impulses for operating said distributors in synchronism and means whereby said distributors at said transmitting station are held in each of their positions until the receiving distributor has reached the equivalent position.

13. In a telegraph system, a transmitting station having a transmitter and a remote receiving station having a receiver, means controlled by said transmitter for transmitting code combinations of impulse conditions to said receiver and means whereby said transmitter is held nonoperative to transmit further impulses following the transmission of any one impulse until the receiver has responded to the last transmitted impulse.

In testimony whereof I have hereunto subscribed my name this 21st day of April, 1925.

THOMAS U. WHITE.